(12) United States Patent
Hong et al.

(10) Patent No.: US 12,186,604 B2
(45) Date of Patent: Jan. 7, 2025

(54) FIREFIGHTING FLUID STORAGE DEVICE, BATTERY PACK, AND ELECTRIC VEHICLE

(71) Applicant: CONTEMPORARY AMPEREX TECHNOLOGY (HONG KONG) LIMITED, Hong Kong (CN)

(72) Inventors: Jiarong Hong, Ningde (CN); Xiaoteng Huang, Ningde (CN); Wenli Wang, Ningde (CN); Yanhuo Xiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 605 days.

(21) Appl. No.: 17/506,852

(22) Filed: Oct. 21, 2021

(65) Prior Publication Data

US 2022/0040513 A1    Feb. 10, 2022

Related U.S. Application Data

(63) Continuation of application No. PCT/CN2020/104707, filed on Jul. 26, 2020.

(30) Foreign Application Priority Data

Aug. 8, 2019  (CN) .......................... 201921276002.8

(51) Int. Cl.
A62C 3/16       (2006.01)
A62C 37/40      (2006.01)
(Continued)

(52) U.S. Cl.
CPC ................ *A62C 3/16* (2013.01); *A62C 37/40* (2013.01); *H01M 10/486* (2013.01); *H01M 50/383* (2021.01); *H01M 2200/10* (2013.01)

(58) Field of Classification Search
CPC .. A62C 3/16; A62C 37/40; A62C 3/07; A62C 35/023; H01M 10/486;
(Continued)

(56) References Cited

U.S. PATENT DOCUMENTS 5,398,851 A    3/1995   Sancoff et al.
5,553,741 A    9/1996   Sancoff et al.
(Continued)

FOREIGN PATENT DOCUMENTS

CN          1132498 A       10/1996
CN        105944260 A   *   9/2016
(Continued)

OTHER PUBLICATIONS

International Search Report dated Oct. 27, 2020 issued in PCT/CN2020/104707.
(Continued)

*Primary Examiner* — Abdullah A Riyami
*Assistant Examiner* — Nader J Alhawamdeh
(74) *Attorney, Agent, or Firm* — Scully, Scott, Murphy & Presser, P.C.

(57) ABSTRACT

An electric vehicle, a battery pack, and a firefighting fluid storage device are disclosed, which relate to the technical field of energy storage devices. The firefighting fluid storage device includes: a box body, where the box body includes an inner cavity and a fluid outlet, the inner cavity is configured to accommodate a firefighting fluid, and the fluid outlet communicates with the inner cavity; and a gas generation component, where the gas generation component is mounted to the box body and configured to release a gas to the inner cavity. When the gas generation component releases the gas, the firefighting fluid moves toward the fluid outlet under the action of the gas.

18 Claims, 5 Drawing Sheets

(51) Int. Cl.
*H01M 10/48* (2006.01)
*H01M 50/383* (2021.01)

(58) Field of Classification Search
CPC .......... H01M 50/383; H01M 2200/10; H01M 2200/103; H01M 2220/20; H01M 50/143; H01M 50/249; Y02E 60/10
See application file for complete search history.

(56) References Cited

U.S. PATENT DOCUMENTS

| | | | |
|---|---|---|---|
| 5,558,255 A | | 9/1996 | Sancoff et al. |
| 11,883,700 B1 * | | 1/2024 | Broidy .................. A62C 31/28 |
| 2022/0040513 A1 * | | 2/2022 | Hong ................. H01M 10/486 |

FOREIGN PATENT DOCUMENTS

| | | |
|---|---|---|
| CN | 206566392 U | 10/2017 |
| CN | 108075084 A | 5/2018 |
| CN | 208835139 U | 5/2019 |
| CN | 209104233 U | 7/2019 |
| CN | 210073972 U | 2/2020 |
| GB | 2304043 A | 3/1997 |
| JP | H08117353 A | 5/1996 |
| JP | H11226144 A | 8/1999 |

OTHER PUBLICATIONS

Extended European Search report dated May 9, 2022 received in European Patent Application No. EP 20850262.5.

* cited by examiner

FIREFIGHTING FLUID STORAGE DEVICE, BATTERY PACK, AND ELECTRIC VEHICLE

CROSS-REFERENCE TO RELATED APPLICATIONS

This application is a continuation of International Application No. PCT/CN2020/104707, filed on Jul. 26, 2020, which claims priority to Chinese Patent Application No. 201921276002.8, filed on Aug. 8, 2019. The disclosures of the aforementioned applications are hereby incorporated by reference in their entireties.

TECHNICAL FIELD

The present application relates to the technical field of energy storage devices, and in particular, to a firefighting fluid storage device, a battery pack, and an electric vehicle.

BACKGROUND

At present, electric vehicle safety accidents occur frequently. One of the major factors causing electric vehicle safety accidents is spontaneous combustion of battery packs. The battery pack includes a box body and battery units located inside the box body. When thermal runaway occurs with a battery unit, a high-temperature heat flow is released. After the high-temperature heat flow leaks and comes in contact with the air, the heat flow is prone to combustion. The battery pack burns when the heat flow diffuses to an adjacent battery unit. This severely harms personal safety of passengers and drivers.

SUMMARY

In view of this, embodiments of the present application provide a firefighting fluid storage device, a battery pack, and an electric vehicle to resolve all or at least some of the foregoing problems.

An embodiment of the present application provides a firefighting fluid storage device, including:
  a box body, where the box body includes an inner cavity and a fluid outlet, the inner cavity is configured to accommodate a firefighting fluid, and the fluid outlet communicates with the inner cavity; and a gas generation component, where the gas generation component is mounted to the box body and configured to release a gas to the inner cavity;
  when the gas generation component releases the gas, the firefighting fluid moves toward the fluid outlet under an action of the gas.

In a possible design, the firefighting fluid storage device further includes a driving member. The driving member is located in the inner cavity;
  when the gas generation component releases the gas, the driving member drives the firefighting fluid to move toward the fluid outlet under the action of the gas.

In a possible design, the driving member includes a mounting portion and a deformable portion. The deformable portion is mounted to the mounting portion. The mounting portion is connected to the box body;
  the deformable portion is a flexible member.

In a possible design, the deformable portion separates the inner cavity into a first cavity and a second cavity;
  the first cavity includes a first side wall, and the second cavity includes a second side wall.

the fluid outlet is disposed on the first side wall. The gas generation component is disposed on the second side wall.

In a possible design, the deformable portion includes at least a first deformed state and a second deformed state;
  in the first deformed state, at least part of the deformable portion abuts against the first side wall, or a first preset distance is provided between the deformable portion and the first side wall in a length direction;
  in the second deformed state, a second preset distance is provided between the deformable portion and the gas generation component in the length direction.

In a possible design, the first side wall and the second side wall are disposed opposite each other.

In a possible design, the mounting portion is inclined in a height direction.

In a possible design, the box body is a rectangular structure. In the height direction, the box body includes a top wall and a bottom wall disposed opposite each other;
  a first bent portion is formed at a position where the top wall is connected to the first side wall. A second bent portion is formed at a position where the bottom wall is connected to the second side wall;
  in the height direction, one end of the mounting portion is fixedly connected to the first bent portion, and the other end of the mounting portion is fixedly connected to the second bent portion.

In a possible design, the box body includes a first box body and a second box body that are separate from each other;
  the mounting portion is tightly sandwiched between the first box body and the second box body;
  the mounting portion is connected to the first box body and the second box body by a sealant.

In a possible design, the gas generation component is detachably connected to the box body.

In a possible design, a sealing ring is disposed between the gas generation component and the box body.

An embodiment of the present application provides a battery pack, including:
  a housing, where the housing includes an accommodating cavity;
  battery unit, where the battery unit is located in the accommodating cavity, and the battery unit includes an explosion-proof opening;
  a spraying pipeline, where the spraying pipeline is located in the accommodating cavity and disposed corresponding to the explosion-proof opening; and
  a firefighting fluid storage device, where the firefighting fluid storage device is the firefighting fluid storage device described above;
  where the fluid outlet communicates with the spraying pipeline, and the spraying pipeline can form an opening.

In a possible design, the battery pack further includes:
  a monitoring device configured to monitor a temperature signal of the accommodating cavity; and
  a control device configured to control an ignition wire according to the temperature signal, such that the ignition wire drives the gas generation component to release the gas.

In a possible design, a control circuit is disposed inside the gas generation component. The control circuit includes a temperature control fuse;
  when the temperature control fuse is blown, the control circuit can control the gas generation component to release the gas.

An embodiment of the present application further provides an electric vehicle, including the battery pack described above.

BRIEF DESCRIPTION OF THE DRAWINGS

To more clearly describe the technical solutions in the embodiments of the present application, the drawings required for describing the embodiments will be briefly described below. Apparently, the drawings in the following description show only some of the embodiments of the present application, and those of ordinary skill in the art may still derive other drawings from these drawings without creative efforts.

REFERENCE NUMERALS

A: Battery pack
1: Firefighting fluid storage device
11: Box body
110: Inner cavity
111: First box body
111a: Recess portion
112: Second box body
112a: Holder
113: Fluid outlet
114: Top wall
115: Bottom wall
116: First bent portion
117: Second bent portion
118: First cavity
118a: First side wall
119: Second cavity
119a: Second side wall
12: Driving member
121: Mounting portion
121a: Upper end
121b: Lower end
122: Deformable portion
123: Third cavity
13: Gas generation assembly
131: Fastener
132: Ignition wire
133: Gas generation component
14: Sealing ring
15: Sealant
2: Spraying pipeline
3: Battery module
31: Battery unit
4: Housing
41: Accommodating cavity
X: Length direction
Y: Width direction
Z: Height direction

DETAILED DESCRIPTION OF THE EMBODIMENTS

For a better understanding of the technical solutions of the present application, the following describes in detail the embodiments of the present application with reference to the accompanying drawings.

Apparently, the described embodiments are merely some rather than all of the embodiments of the present application. Based on the embodiments in the present application, all other embodiments derived by those of ordinary skill in the art without creative efforts shall fall within the protection scope of the present application.

The terms used in the embodiments of the present application are intended only to describe specific embodiments and are not intended to limit the present application. The singular forms of "a/an", "said" and "the" used in the embodiments of the present application and the appended claims are also intended to include plural forms, unless the context clearly implies otherwise.

It should be understood that the term "and/or" used herein merely describes an association relationship between associated objects, and indicates that three types of relationships may exist. For example, A and/or B may indicate that A exists alone, both A and B exist, or B exists alone. In addition, the character "/" used herein generally indicates that the associated objects are in an "or" relationship.

It should be noted that terms such as "upper", "lower", "left", and "right" described in the embodiments of the present application indicate orientation from the angle shown in the drawings, and should not be construed as a limitation to the embodiments of the present application. In addition, in the context, it should also be understood that when it is mentioned that an element is connected to another element, the element may be directly connected to the another element, or indirectly connected to the another element by using an intermediate element.

Current battery packs are usually provided with a firefighting spraying system. The firefighting spraying system includes a liquid storage device and a gas storage device. A compressed gas in the gas storage device drives a firefighting liquid in the liquid storage device to spray.

However, the foregoing firefighting spraying system that includes the gas storage device and liquid storage device occupies large space and is not conducive to space layout. In addition, that the gas storage device stores the compressed gas increases latent dangers of the battery pack.

Figure 1:
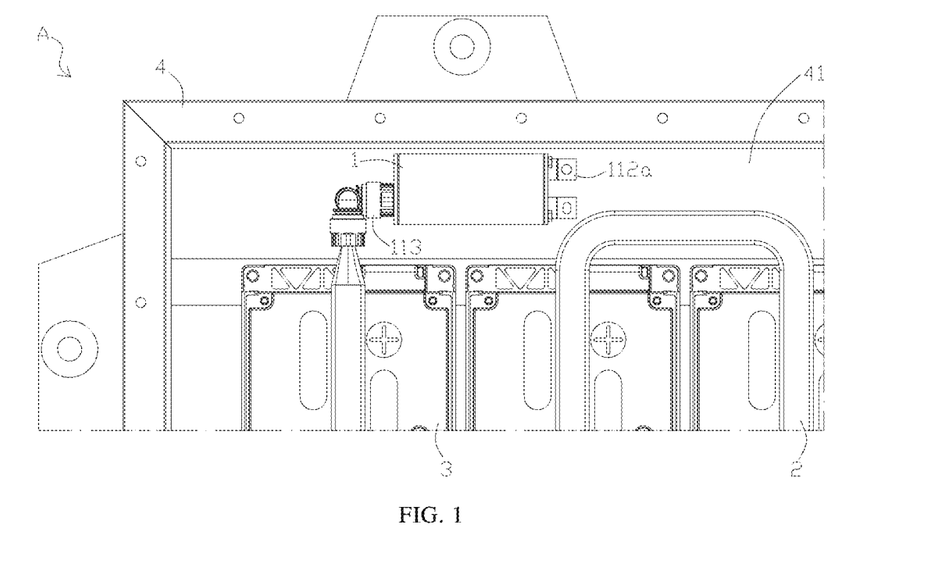
FIG. 1 is a schematic diagram of a partial structure of an embodiment of a battery pack according to the present application.
Figure 2:
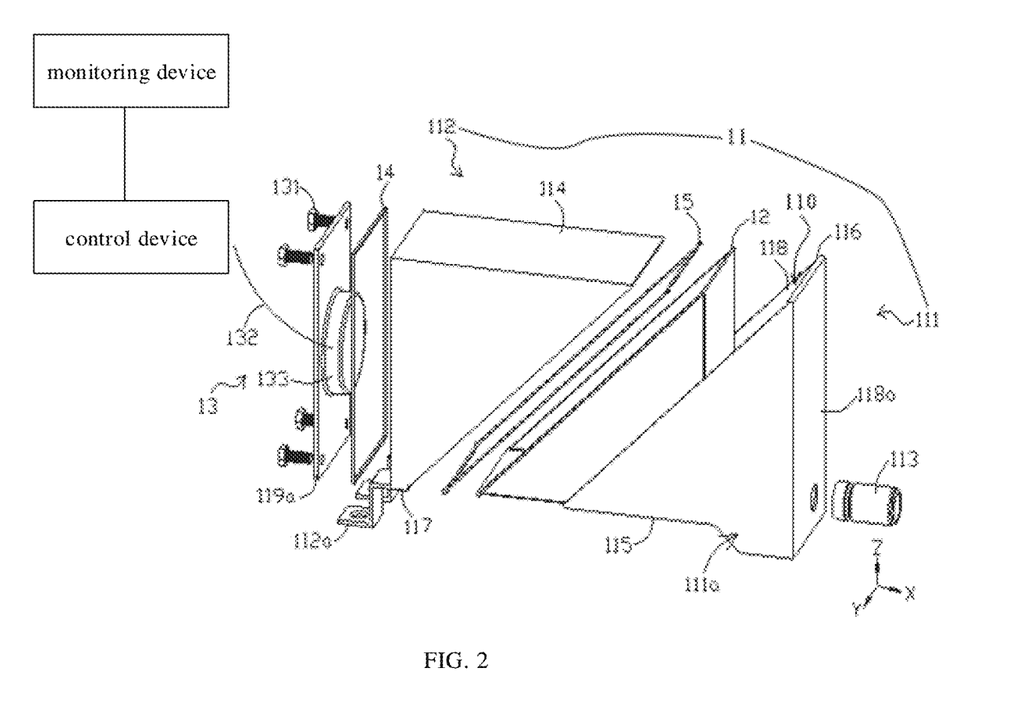
FIG. 2 is an exploded view of a firefighting fluid storage device in FIG. 1.
Figure 3:
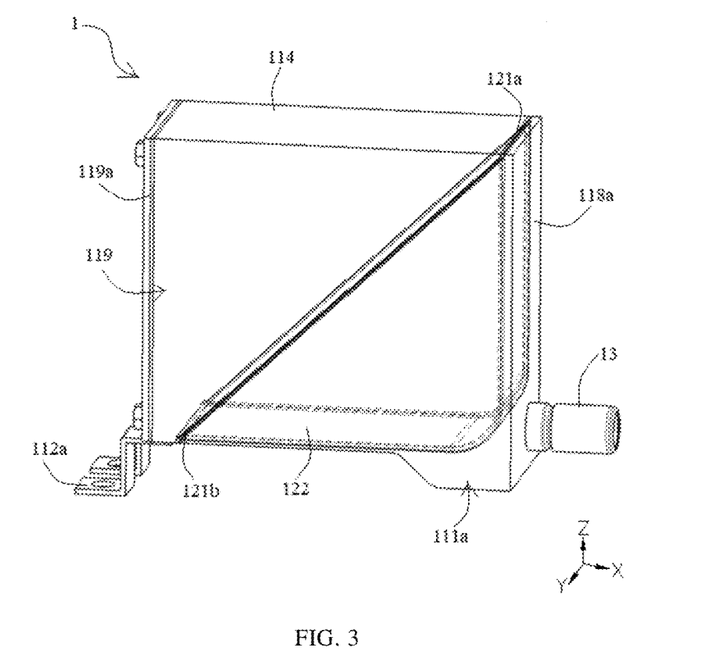
FIG. 3 is a schematic structural diagram of the firefighting fluid storage device in FIG. 2 in a first working state.
Figure 4:
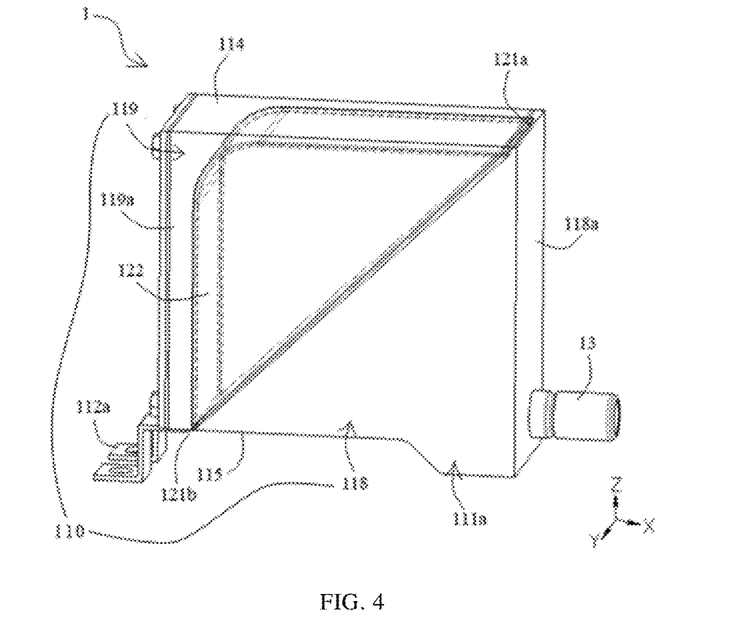
FIG. 4 is a schematic structural diagram of the firefighting fluid storage device in FIG. 2 in a second working state.
Figure 5:
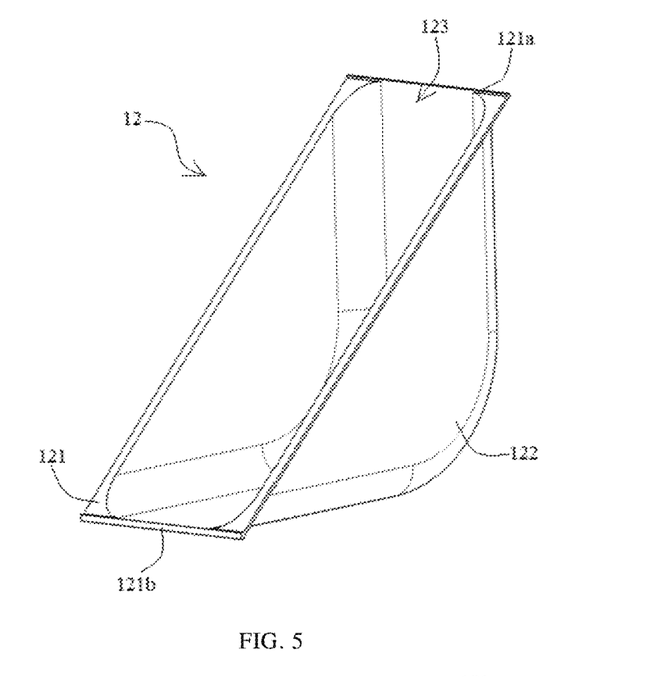
FIG. 5 is a schematic structural diagram of a driving member in FIG. 3.
Figure 6:
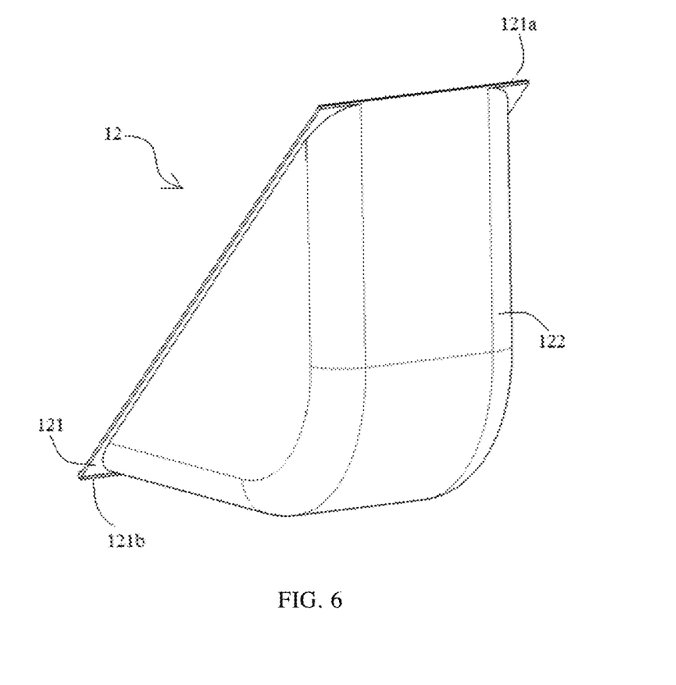
FIG. 6 is a schematic structural diagram from another angle of view of FIG. 5.
Figure 7:
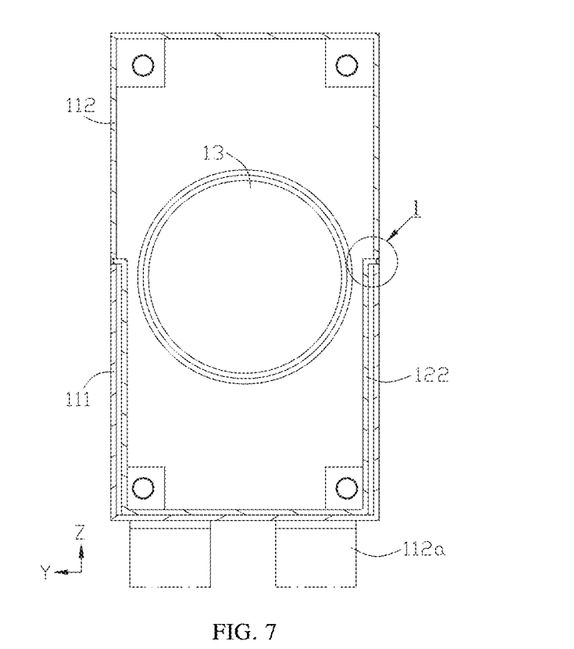
FIG. 7 is a cross-sectional view of FIG. 3.
Figure 8:
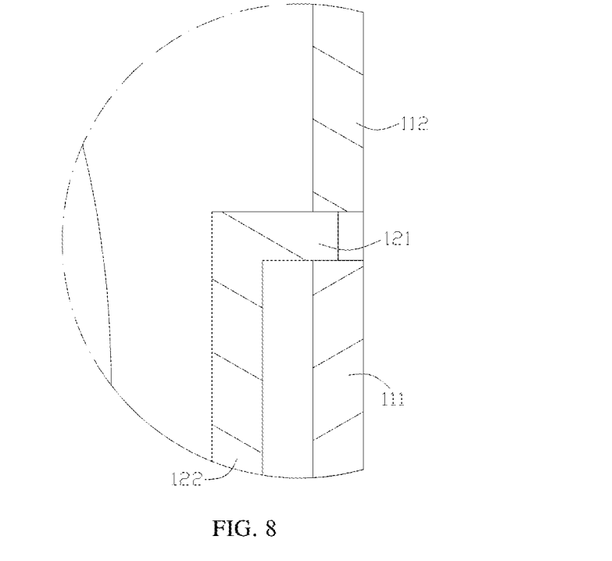
FIG. 8 is an enlarged view of a portion I in FIG. 7.

Refer to FIG. 1 to FIG. 8. FIG. 1 is a schematic diagram of a partial structure of an embodiment of a battery pack according to the present application. FIG. 2 is an exploded view of a firefighting fluid storage device in FIG. 1. FIG. 3 is a schematic structural diagram of the firefighting fluid storage device in FIG. 2 in a first working state. FIG. 4 is a schematic structural diagram of the firefighting fluid storage device in FIG. 2 in a second working state. FIG. 5 is a schematic structural diagram of a driving member in FIG. 3. FIG. 6 is a schematic structural diagram from another angle of view of FIG. 5. FIG. 7 is a cross-sectional view of FIG. 3. FIG. 8 is an enlarged view of a portion I in FIG. 7.

An embodiment of the present application provides a battery pack A. As shown in FIG. 1, the battery pack A includes a housing 4, where the housing 4 includes an accommodating cavity 41; and a battery module 3 disposed in the accommodating cavity 41 of the housing 4. The battery module 3 includes a plurality of battery units 31. Each of the battery units 31 includes an explosion-proof opening. The explosion-proof opening may be provided with an explosion-proof valve. When thermal runaway occurs with the battery unit 31, a high-temperature and high-pressure heat flow is generated inside the battery unit 31. The explosion-proof valve is configured to discharge the heat flow to reduce the risk of explosion of the battery unit 31. When the heat flow is discharged via the explosion-proof valve, the high-temperature heat flow may cause an adjacent battery unit 31 to burn.

To reduce the risk of burning an adjacent battery unit 31 when thermal runaway occurs with a battery unit 31, a spraying system is further disposed in the battery pack A in the present application, thereby reducing diffusion of a heat flow and improving the safety of the battery pack A. The spraying system includes a spraying pipeline 2 and a firefighting fluid storage device 1. The spraying pipeline 2 communicates with the firefighting fluid storage device 1. The firefighting fluid storage device 1 is configured to store a firefighting fluid. The spraying pipeline 2 is disposed corresponding to the explosion-proof opening.

When thermal runaway occurs with a battery unit 31 and a heat flow is discharged via the explosion-proof opening, the spraying pipeline 2 can form an opening under the action of the heat flow, such that the firefighting fluid in the spraying pipeline 2 is discharged via the opening, and the pressure in the spraying pipeline 2 is reduced. Therefore, the firefighting fluid in the firefighting fluid storage device 1 enters the spraying pipeline 2 and is discharged via the opening, to spray the battery unit 31.

The firefighting liquid in the present application includes a fluoride liquid. The fluoride liquid can chemically react with the heat flow from the battery unit 31 after being sprayed out of the spraying pipeline 2 to absorb heat and prevent heat diffusion.

Specifically, as shown in FIG. 2 to FIG. 4, the firefighting fluid storage device 1 includes a box body 11. The box body 11 includes an inner cavity 110 and a fluid outlet 113. The inner cavity 110 is configured to accommodate the firefighting fluid. The fluid outlet 113 communicates with the inner cavity 110 of the box body 11 and the spraying pipeline 2, such that the firefighting fluid in the inner cavity 110 of the box body 11 can enter the spraying pipeline 2 via the fluid outlet 113.

The firefighting fluid storage device 1 further includes a gas generation component 133. The gas generation component 133 can generate a gas. The firefighting fluid moves toward the fluid outlet 113 under the action of the gas generated by the gas generation component 133.

In the present application, when no thermal runaway occurs with the battery unit 31 in the battery pack A, the gas generation component 133 does not generate the gas, and the spraying pipeline 2 does not form the opening. When thermal runaway occurs with the battery unit 31 in the battery pack A and the heat flow is sprayed via the explosion-proof opening, the spraying pipeline 2 at this position can form the opening under the action of the heat flow, and the firefighting fluid in the spraying pipeline 2 can be discharged via the opening. In addition, the gas generation component 133 generates the gas. Under the action of the gas, the firefighting fluid in the inner cavity 110 of the box body 1 can be driven into the spraying pipeline 2 and sprayed via the opening of the spraying pipeline 2, to prevent heat diffusion.

The firefighting fluid storage device 1 does not need to be provided with a gas storage component. This helps reduce the volume of the firefighting fluid storage device 1 and increase energy density of the battery pack A. This also helps increase the volume of the firefighting fluid in the inner cavity 110 of the box body 11, to improve a volume utilization of the box body 11. In addition, when the firefighting fluid storage device 1 is provided with the gas generation component 133 and the gas generation component 133 does not generate the gas, there is no high-pressure gas in the inner cavity 110 of the box body 11, to prevent gas leakage caused by excessively high gas pressure in the box body 11, and avoid low safety caused by the excessively high pressure in the inner cavity 110 of the box body 11.

The gas generation component 133 is a gas generation component commonly used in the prior art, in which there are gas generation substances. After the gas generation substances are mixed, the gas can be released, and the released gas should be an incombustible gas, for example, an inert gas such as nitrogen. For a specific structure of the gas generation component 133, refer to the prior art.

In addition, the firefighting fluid storage device 1 in the present application can be used in the spraying system of the battery pack A and can also be used in other scenarios.

Specifically, the gas generation component 133 is detachably connected to the box body 11. This facilitates disassembly and maintenance when the gas generation component 133 fails. As shown in FIG. 2, the gas generation component 133 is detachably connected to the box body 11 by using a fastener 131.

To prevent gas leakage at the gas generation component 133, a sealing ring 14 is further disposed at a connection between the gas generation component 133 and the box body 11, to improve sealing performance of the box body 11.

In a possible design, the firefighting fluid storage device 1 further includes a driving member 12. The driving member 12 is located in the inner cavity 110 of the box body 11. When the gas generation component 133 releases the gas, the driving member 12 is configured to drive the firefighting fluid to move toward the fluid outlet 113, to help the firefighting fluid to be discharged via the fluid outlet 113, enter the spraying pipeline 2, and be discharged via the opening of the spraying pipeline 2.

In this embodiment, by disposing the driving member 12 in the firefighting fluid storage device 1, when the gas generation component 133 releases the gas, the firefighting fluid can be driven by the driving member 12, to help the firefighting fluid to move toward the fluid outlet 113, and improve the accuracy of the flow of the firefighting fluid.

In a possible design, as shown in FIG. 5 and FIG. 6, the driving member 12 includes a mounting portion 121 and a deformable portion 122. The mounting portion 121 is connected to the box body 11, such that the driving member 12 is mounted to the box body 11. The deformable portion 122 is a flexible member and is deformable under pressure.

The deformable portion 122 may be made of nylon, can isolate the liquid and gas, and is deformable. In this embodiment, the deformation of the deformable portion 122 includes a change in the shape of the deformable portion 122. When the deformable portion 122 includes an elastic structure, the deformation in this embodiment may include elastic deformation. To be specific, a wall surface of the deformable portion 122 is stretched or compressed. When the deformable portion 122 includes an inelastic structure, the deformation in this embodiment is the change in the shape of the deformable portion 122 surrounded by a flexible material, and the wall surface of the deformable portion 122 is not stretched or compressed, or an amount of stretch (or an amount of compression) can be ignored.

Specifically, as shown in FIG. 4 and FIG. 5, the deformable portion 122 separates the inner cavity 110 of the box body 11 into a first cavity 118 and a second cavity 119. The first cavity 118 does not communicate with the second cavity 119. The first cavity 118 is configured to accommodate the firefighting fluid, and the second cavity 119 is configured to accommodate the gas generated by the gas generation component 133. The first cavity 118 includes a first side wall 118a, and the second cavity 119 includes a second side wall 119a. The fluid outlet 113 is disposed on the first side wall 118a, and the gas generation component 133 is disposed on the second side wall 119a.

In this embodiment, the deformable portion 122 of the driving member 12 serves as a structure that separates the first cavity 118 and the second cavity 119. Therefore, when the deformable portion 122 is deformed, the volumes of the first cavity 118 and the second cavity 119 can be changed. When the volume of the first cavity 118 is reduced, the firefighting fluid can be driven into the spraying pipeline 2 via the fluid outlet 113. When the volume of the first cavity 118 is increased, the volume of the firefighting fluid can be increased. When the fluid outlet 113 and the gas generation component 133 are respectively located on the first side wall 118a and the second side wall 119a, the firefighting fluid can be quickly discharged via the fluid outlet 113, and the sensitivity of the spraying system is improved.

In a possible design, as shown in FIG. 2, the first side wall 118a and the second side wall 119a are disposed opposite each other. To be specific, the fluid outlet 113 and the gas generation component 133 are disposed opposite each other. This can further help the firefighting fluid to be quickly discharged via the fluid outlet 113.

Specifically, as shown in FIG. 5, the wall surface of the deformable portion 122 encircles a third cavity 123. The third cavity 123 is configured to accommodate the firefighting fluid or gas. In a working process of the deformable portion 122, when the pressure on both sides of the deformable portion 122 changes, the status of the deformable portion 122 also changes. In a plurality of deformed states, the deformable portion 122 includes at least a first deformed state shown in FIG. 3 and a second deformed state shown in FIG. 4.

As shown in FIG. 4, when the deformable portion 122 is in the second deformed state, there is a second preset distance between the deformable portion 122 and the gas generation component 133 in a length direction X. The second preset distance makes the deformable portion 122 not in contact with the gas generation component 133, such that the gas generation component 133 can release the gas. The second preset distance is relatively small. In other words, the deformable portion 122 is close to the gas generation component 133, such that the volume and gas pressure of the second cavity 119 is relatively small, and the volume of the first cavity 118 is relatively large. In this way, the firefighting fluid storage device 1 can be in a liquid filling state. To be specific, the firefighting fluid can enter the first cavity 118 via a fluid inlet, and as hydraulic pressure increases, the deformable portion 122 can be promoted to be deformed toward the second side wall 119a. In this case, the third cavity 123 of the deformable portion 122 faces the first cavity 118, and can be used to store the firefighting fluid, such that the firefighting fluid can nearly fill the entire inner cavity 110 of the box body 11, to increase the volume of the firefighting fluid stored in the box body 11.

As shown in FIG. 3, when the gas generation component 133 is triggered to release the gas, the gas pressure in the second cavity 119 gradually increases, thereby driving the deformable portion 122 to deform toward the first side wall 118a, and driving the firefighting fluid in the first cavity 118 to be discharged via the fluid outlet 113. As the pressure in the second cavity 119 gradually increases, in a length direction X, a first preset distance between the deformable portion 122 and the first side wall 118a gradually reduces. As the firefighting fluid is discharged via the fluid outlet 113 and the gas generation component 133 releases the gas, at least part of the deformable portion 122 can abut against the first side wall 118a. In this case, the third cavity 123 of the deformable portion 122 faces the second cavity 119 and can be used to store the gas. This helps the firefighting fluid in the first cavity 118 to be completely discharged and improve a utilization of the firefighting fluid.

Therefore, in this embodiment, the driving member 12 can reduce the volume of the firefighting fluid storage device, increase the utilization of the firefighting fluid storage device, and increase the energy density of the battery pack A while the sufficient firefighting fluid is discharged to the spraying pipeline 2.

In addition, as shown in FIG. 2 to FIG. 4, in a height direction Z, the mounting portion 121 includes an upper end 121a and a lower end 121b disposed opposite each other. In the mounting portion 121, the upper end 121a and the lower end 121b are connected to the box body 11. In a specific embodiment, the upper end 121a is close to the first side wall 118a, and the lower end 121b is close to the second side wall 112c. In this case, the mounting portion 121 is inclined in the height direction Z. In another specific embodiment, the upper end 121a is close to the second side wall 112c, and the lower end 121b is close to the first side wall 118a. In this case, the mounting portion 121 is inclined in the height direction Z.

In this embodiment, compared with that the mounting portion 121 is disposed along a vertical plane or a horizontal plane, when the mounting portion 121 is inclined, the deformable portion 122 can nearly fit the first side wall 118a or the second side wall 112c after being deformed. This can increase the volume of the firefighting fluid stored in the box body 11, and helps the firefighting fluid in the inner cavity 110 of the box body 11 to be completely discharged, to improve the utilization of the firefighting fluid storage device and the energy density of the battery pack A.

Specifically, as shown in FIG. 2, the box body 11 includes a rectangular structure, including a top wall 114, a bottom wall 115, and four side walls. A first bent portion 116 is formed at a position where the top wall 114 is connected to the first side wall 118a of the first cavity 118. A second bent portion 117 is formed at a position where the bottom wall 115 is connected to the second side wall 119a of the second cavity 119. The first bent portion 116 and the second bent portion 117 are on a diagonal of the box body 11. Therefore, in the height direction Z, one end of the mounting portion 121 is fixedly connected to the first bent portion 116, and the other end is fixedly connected to the second bent portion 117. In other words, the mounting portion 121 is disposed along the diagonal of the box body 11. This further increases the volume of the firefighting fluid stored in the box body 11, and helps the firefighting fluid in the inner cavity 110 of the box body 11 to be completely discharged, to improve the utilization of the firefighting fluid storage device and the energy density of the battery pack A.

It should be noted that, as shown in FIG. 2 to FIG. 4, the gas generation component 133 is disposed on the second side wall 119a. Therefore, the gas generation component 133 occupies part of the space of the second cavity 119. Therefore, there is a specific distance between the second bent portion 117 and the second side wall 119a.

In the foregoing embodiments, the box body 11 includes a first box body 111 and a second box body 112 that are separate from each other. The first box body 111 and the second box body 112 both include a structure similar to a triangular prism. The first box body 111 and the second box body 112 are joined to form the rectangular box body 11. As shown in FIG. 7 and FIG. 8, the mounting portion 121 is tightly sandwiched between the first box body 111 and the second box body 112. In this way, the driving member 12 is mounted into the box body 11.

The first bent portion 116 is a part of the first box body 111, and the first bent portion 116 is an end of the first box body 111. Therefore, the first bent portion 116 is butted with a corresponding end of the second box body 112. The second bent portion 117 is a part of the second box body 112, and the second bent portion 117 is an end of the second box body 112. Therefore, the second bent portion 117 is butted with a corresponding end of the first box body 111.

As shown in FIG. 2, the other ends of the first box body 111 and the second box body 112 are also butted, such that the first box body 111 is fixedly connected to the second box body 112 to form the complete box body 11. The mounting portion 121 of the driving member 12 is located between the ends of the first box body 111 and the second box body 112, such that the mounting portion 121 is tightly sandwiched between the first box body 111 and the second box body 112.

In this embodiment, the box body 11 separated into two parts can facilitate the mounting of the driving member 12. A sealant 15 is further disposed between the first box body 111 and the mounting portion 121, and between the second box body 112 and the mounting portion 121. The sealant 15 improves the mounting reliability and sealing performance of the mounting portion 121 and the box body 11, and the mounting portion 121 remains stationary during the deformation of the deformable portion 122.

In the driving member 12, the deformable portion 122 is a flexible and deformable structure, and the mounting portion 121 is a rigid structure, to improve the mounting reliability of the mounting portion 121 and the box body 11.

It should be noted that the first cavity 118 is not an inner cavity of the first box body 111, and the second cavity 119 is not an inner cavity of the second box body 112. The inner cavity of the first box body 111 and that of the second box body 112 each is half of the inner cavity 110 of the rectangular box body 11. The shape and size of the first cavity 118 and the second cavity 119 continuously change as the deformable portion 122 deforms, and the two cavities approximately form the internal cavity 110 of the box body 11.

In addition, a recess portion 111a is disposed on a side of the first box body 111 being close to the fluid outlet 113, to help the firefighting fluid to be discharged via the fluid outlet 113. A holder 112a is disposed on an outer side wall of the second box body 112. The box body 11 is fastened into the accommodating cavity 41 of the housing 4 of the battery pack A through the holder 112a, and the holder 112a is disposed on the second side wall 119a.

As shown in the FIG. 2, in the foregoing embodiments, the firefighting fluid storage device 1 includes a gas generation assembly 13. The gas generation assembly 13 includes the gas generation component 133 and an ignition wire 132. The ignition wire 132 is connected to the gas generation component 133. When a trigger condition is met, the ignition wire 132 is configured to energize the gas generation component 133 to drive the gas generation component 133 to release the gas. Specifically, the trigger condition is that thermal runaway occurs with any battery unit 31 in the battery pack A. When a monitoring device of the battery pack A detects that thermal runaway occurs with the battery unit 31, a control device can send a control signal to the ignition wire 132, and the ignition wire 132 energizes the gas generation component 133, so as to discharge the firefighting fluid.

Figure 9:
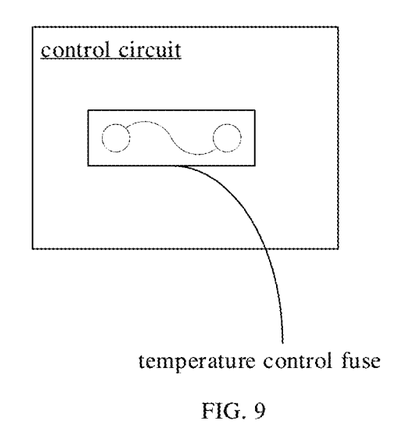
FIG. 9 is a brief schematic of control circuit disposed inside the gas generation component.

As shown in the FIG. 9, alternatively, a control circuit including a temperature control fuse is disposed inside the gas generation component 133 in the gas generation assembly 13. When thermal runaway occurs with any battery unit 31 in the battery pack A, a temperature in the battery pack A increases. When a temperature of the temperature control fuse reaches a preset temperature, the temperature control fuse is blown, and the control circuit controls the gas generation component 133 to release the gas. The preset temperature is set to a lowest temperature in the battery pack A when thermal runaway occurs with a battery unit 31, so as to discharge the firefighting fluid in time.

An embodiment of the present application further provides an electric vehicle, including the battery pack A.

The foregoing description is only the better embodiments of the present application and is not intended to limit the present application. Any modifications, equivalent substitutions, improvements, or the like made within the spirit and principles of the present application shall fall within the protection scope of the present application.

What is claimed is:
1. A firefighting fluid storage device, comprising:
a box body, wherein the box body comprises an inner cavity and a fluid outlet, the inner cavity is configured to accommodate a firefighting fluid, and the fluid outlet communicates with the inner cavity; and
a gas generation component, wherein the gas generation component is mounted to the box body and configured to release a gas to the inner cavity,
wherein when the gas generation component releases the gas, the firefighting fluid moves toward the fluid outlet under an action of the gas;
wherein the firefighting fluid storage device further comprises a driving member, and the driving member is located in the inner cavity;
when the gas generation component releases the gas, the driving member drives the firefighting fluid to move toward the fluid outlet under the action of the gas;
wherein the driving member comprises a mounting portion and a deformable portion, the deformable portion is mounted to the mounting portion, and the mounting portion is connected to the box body; and
wherein the deformable portion is a flexible member.
2. The firefighting fluid storage device according to claim 1, wherein the deformable portion separates the inner cavity into a first cavity and a second cavity;
the first cavity comprises a first side wall, and the second cavity comprises a second side wall; and
the fluid outlet is disposed on the first side wall, and the gas generation component is disposed on the second side wall.
3. The firefighting fluid storage device according to claim 2, wherein the deformable portion comprises at least a first deformed state and a second deformed state;
in the first deformed state, at least part of the deformable portion abuts against the first side wall, or a first preset distance is provided between the deformable portion and the first side wall in a length direction; and in the second deformed state, a second preset distance is provided between the deformable portion and the gas generation component in the length direction.

4. The firefighting fluid storage device according to claim 2, wherein the first side wall and the second side wall are disposed opposite each other.

5. The firefighting fluid storage device according to claim 1, wherein in a height direction, the mounting portion comprises an upper end and a lower end disposed opposite each other; and the upper end is close to the first side wall, and the lower end is close to the second side wall, or the upper end is close to the second side wall, and the lower end is close to the first side wall.

6. The firefighting fluid storage device according to claim 5, wherein the box body is a rectangular structure, and in the height direction, the box body comprises a top wall and a bottom wall disposed opposite each other;

a first bent portion is formed at a position where the top wall is connected to the first side wall, and a second bent portion is formed at a position where the bottom wall is connected to the second side wall; and in the height direction, one end of the mounting portion is fixedly connected to the first bent portion, and an other end is fixedly connected to the second bent portion.

7. The firefighting fluid storage device according to claim 1, wherein the box body comprises a first box body and a second box body that are separate from each other;

the mounting portion is tightly sandwiched between the first box body and the second box body; and the mounting portion is connected to the first box body and the second box body by a sealant.

8. The firefighting fluid storage device according to claim 1, wherein the gas generation component is detachably connected to the box body.

9. The firefighting fluid storage device according to claim 8, wherein a sealing ring is disposed between the gas generation component and the box body.

10. A battery pack, comprising:
a housing, wherein the housing comprises an accommodating cavity;
battery unit, wherein the battery unit is located in the accommodating cavity, and the battery unit comprises an explosion-proof opening;
a spraying pipeline, wherein the spraying pipeline is located in the accommodating cavity and disposed corresponding to the explosion-proof opening; and
a firefighting fluid storage device, wherein the firefighting fluid storage device comprises a box body and a gas generation component, the box body comprises an inner cavity and a fluid outlet, the inner cavity is configured to accommodate a firefighting fluid, and the fluid outlet communicates with the inner cavity, the gas generation component is mounted to the box body and configured to release a gas to the inner cavity, when the gas generation component releases the gas, the firefighting fluid moves toward the fluid outlet under an action of the gas,
wherein the fluid outlet communicates with the spraying pipeline, and the spraying pipeline can form an opening.

11. The battery pack according to claim 10, wherein the gas generation assembly further comprises an ignition wire, and the ignition wire is connected to the gas generation component; and the battery pack further comprises:
a monitoring device configured to monitor a temperature signal of the accommodating cavity; and
a control device configured to control the ignition wire according to the temperature signal, such that the ignition wire drives the gas generation component to release the gas.

12. The battery pack according to claim 10, wherein a control circuit is disposed inside the gas generation component, and the control circuit comprises a temperature control fuse; and when the temperature control fuse is blown, the control circuit can control the gas generation component to release the gas.

13. The battery pack according to claim 10, wherein the firefighting fluid storage device further comprises a driving member, and the driving member is located in the inner cavity; and when the gas generation component releases the gas, the driving member drives the firefighting fluid to move toward the fluid outlet under the action of the gas.

14. The battery pack according to claim 13, wherein the driving member comprises a mounting portion and a deformable portion, the deformable portion is mounted to the mounting portion, and the mounting portion is connected to the box body; and the deformable portion is a flexible member.

15. The battery pack according to claim 14, wherein the deformable portion separates the inner cavity into a first cavity and a second cavity;

the first cavity comprises a first side wall, and the second cavity comprises a second side wall; and the fluid outlet is disposed on the first side wall, and the gas generation component is disposed on the second side wall.

16. The battery pack according to claim 15, wherein the deformable portion comprises at least a first deformed state and a second deformed state;

in the first deformed state, at least part of the deformable portion abuts against the first side wall, or a first preset distance is provided between the deformable portion and the first side wall in a length direction; and in the second deformed state, a second preset distance is provided between the deformable portion and the gas generation component in the length direction.

17. The battery pack according to claim 15, wherein the first side wall and the second side wall are disposed opposite each other.

18. An electric vehicle, comprising a battery pack, the battery pack comprising:
a housing, wherein the housing comprises an accommodating cavity;
battery unit, wherein the battery unit is located in the accommodating cavity, and the battery unit comprises an explosion-proof opening;
a spraying pipeline, wherein the spraying pipeline is located in the accommodating cavity and disposed corresponding to the explosion-proof opening; and
a firefighting fluid storage device, wherein the firefighting fluid storage device comprises a box body and a gas generation component, the box body comprises an inner cavity and a fluid outlet, the inner cavity is configured to accommodate a firefighting fluid, and the fluid outlet communicates with the inner cavity, the gas generation component is mounted to the box body and configured to release a gas to the inner cavity, when the gas generation component releases the gas, the firefighting fluid moves toward the fluid outlet under an action of the gas, wherein the fluid outlet communicates with the spraying pipeline, and the spraying pipeline can form an opening.

* * * * *